(12) United States Patent
Nakajima

(10) Patent No.: US 6,334,212 B1
(45) Date of Patent: Dec. 25, 2001

(54) COMPILER

(75) Inventor: Masaitsu Nakajima, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/281,812

(22) Filed: Mar. 31, 1999

(30) Foreign Application Priority Data

Apr. 1, 1998 (JP) .................................................. 10-088473

(51) Int. Cl.⁷ ...................................................... G06F 9/45
(52) U.S. Cl. ...................................................... 717/5
(58) Field of Search .................................................. 717/5

(56) References Cited

U.S. PATENT DOCUMENTS

| | | | |
|---|---|---|---|
| 5,148,271 | * 9/1992 | Kato et al. | 348/390 |
| 5,440,701 | 8/1995 | Matsuzaki et al. | 712/210 |
| 5,774,737 | * 6/1998 | Nakano | 712/24 |
| 5,790,862 | * 8/1998 | Tanaka et al. | 395/705 |
| 5,854,850 | * 12/1998 | Linford et al. | 382/128 |
| 5,857,103 | * 1/1999 | Grove | 395/705 |
| 5,859,994 | * 1/1999 | Zaidi | 712/209 |
| 5,929,869 | * 7/1999 | Wilde | 345/508 |
| 6,009,261 | * 12/1999 | Scalzi et al. | 395/500.47 |

FOREIGN PATENT DOCUMENTS

| | | |
|---|---|---|
| 5-108373 | 4/1993 | (JP) . |
| 7-105013 | 4/1995 | (JP) . |
| 7-121377 | 5/1995 | (JP) . |
| 8-314727 | 11/1996 | (JP) . |

OTHER PUBLICATIONS

Suzuki et al., "An Architecture of Customized Address Space Microcomputer", Research Report of the Institute of Electronics, Information and Communication Engineers (IEICE), vol. 93 No. 320 (CPSY93–35~44), pp. 17–24.

D.R. Ditzel, et al., "The Hardware Architecture of the CRISP Microprocessor", Proceedings of the 14th Annual International Symposium on Computer Architecture, pp. 309–319, 1987.

\* cited by examiner

Primary Examiner—Mark R. Powell
Assistant Examiner—John Q. Chavis
(74) Attorney, Agent, or Firm—McDermott, Will & Emery

(57) ABSTRACT

A compiler is adapted to minimize the ultimate code size of an object program that has been translated from a source program including a plurality of instructions. The compiler includes first instruction length calculator for calculating a total length of the instructions where variables for the source program are allocated to a first type of register resources in accordance with a first instruction format and second instruction length calculator for calculating a total length of the instructions where the variables are allocated to a second type of register resources in accordance with a second instruction format. The length of one instruction defined by the second instruction format is different from that defined by the first instruction format. The variables are allocated to respectively appropriate ones of the register resources based on the results of calculation derived by the first and second instruction length calculators.

10 Claims, 17 Drawing Sheets

INTERMEDIATE LANGUAGE PROGRAM s1: t1=p1+p2  
s2: t2=p1-p2  
s3: t3=p1*p2  
s4: t4=t1+p1  
s5: t5=t2*p1  } BASIC BLOCK  
s6: t6=t4+p2  
s7: t7=t3*p1  
s8: t8=t4+5

Fig. 6

ALLOCATION OF VARIABLES
TO RESOURCES

| p1 | E0 |
|---|---|
| p2 | E1 |
| t1 | E2 |
| t2 | E3 |
| t3 | E4 |
| t4 | E5 |
| t5 | E6 |
| t6 | E7 |
| t7 | D2 |
| t8 | D3 |

INTERMEDIATE
LANGUAGE PROGRAM s1: t1=p1+p2
s2: t2=p1-p2
s3: t3=p1*p2
s4: t4=t1+p1
s5: t5=t2*p1
s6: t6=t4+p2
s7: t7=t3*p1
s8: t8=t4+5

MACHINE INSTRUCTION
PROGRAM

| s1: | mov | E0, E2 | 3 |
|---|---|---|---|
|  | add | E1, E2 | 3 |
| s2: | mov | E0, E3 | 3 |
|  | sub | E1, E3 | 3 |
| s3: | mov | E0, E4 | 3 |
|  | mul | E1, E4 | 3 |
| s4: | mov | E0, E5 | 3 |
|  | add | E2, E5 | 3 |
| s5: | mov | E0, E6 | 3 |
|  | mul | E3, E6 | 3 |
| s6: | mov | E1, E7 | 3 |
|  | add | E5, E7 | 3 |
| s7: | mov | E0, D2 | 2 |
|  | mul | E4, D2 | 3 |
| s8: | mov | E3, D3 | 2 |
|  | add | 5, D3 | 3 |

46byte

Fig. 7

ALLOCATION OF VARIABLES
TO RESOURCES

| p1 | D2 |
|---|---|
| p2 | D3 |
| t1 | E0 |
| t2 | E1 |
| t3 | E2 |
| t4 | E3 |
| t5 | E4 |
| t6 | E5 |
| t7 | E6 |
| t8 | E7 |

INTERMEDIATE
LANGUAGE PROGRAM s1:   t1=p1+p2
s2:   t2=p1-p2
s3:   t3=p1*p2
s4:   t4=t1+p1
s5:   t5=t2*p1
s6:   t6=t4+p2
s7:   t7=t3*p1
s8:   t8=t4+5

MACHINE INSTRUCTION
PROGRAM s1:  mov    D2, E0    2
     add    D3, E0    3 s2:  mov    D2, E1    2
     sub    D3, E1    3 s3:  mov    D2, E2    2
     mul    D3, E2    3 s4:  mov    D2, E3    2
     add    E0, D3    3 s5:  mov    D2, E4    2
     mul    E1, E4    3 s6:  mov    D3, E5    2
     add    E3, E5    3 s7:  mov    D2, E6    2
     mul    E2, E6    3 s8:  mov    E3, E7    3
     add    5, E7     4
                    ---------
                     42byte

Fig. 8

ALLOCATION OF VARIABLES TO RESOURCES

| p1 | D2 |
|----|----|
| p2 | D3 |
| t1 | E0 |
| t2 | E1 |
| t3 | E2 |
| t4 | E3 |
| t5 | E4 |
| t6 | E5 |
| t7 | E6 |
| t8 | E7 |

INTERMEDIATE LANGUAGE PROGRAM s1:   t1=p1+p2
s2:   t2=p1−p2
s3:   t3=p1*p2
s4:   t4=t1+p1
s5:   t5=t2*p1
s6:   t6=t4+p2
s7:   t7=t3*p1
s8:   t8=t4+5

MACHINE INSTRUCTION PROGRAM

```
s1:   mov   D2, D0    1
      add   D3, D0    1
      mov   D0, E0    2 s2:   mov   D2, D0    1
      sub   D3, D0    2
      mov   D0, E1    2 s3:   mov   D2, D0    1
      mul   D3, D0    2
      mov   D0, E2    2 s4:   mov   D2, D0    1
      add   E0, D0    3
      mov   D0, E3    2 s5:   mov   D2, D0    1
      mul   E1, D0    3
      mov   D0, E4    2 s6:   mov   D3, D0    1
      add   E3, D0    3
      mov   D0, E5    2 s7:   mov   D2, D0    1
      mul   E2, D0    3
      mov   D0, E6    2 s8:   mov   E3, D0    2
      add    5, D0    2
      mov   D0, E7    2
                    --------
                    44byte
```

Fig. 9

ALLOCATION OF VARIABLES
TO RESOURCES

| | |
|---|---|
| p1 | D2 |
| p2 | D3 |
| t1 | E0 |
| t2 | E1 |
| t3 | E2 |
| t4 | E3 |
| t5 | E4 |
| t6 | E5 |
| t7 | E6 |
| t8 | E7 |

INTERMEDIATE
LANGUAGE PROGRAM s1: t1=p1+p2
s2: t2=p1−p2
s3: t3=p1*p2
s4: t4=t1+p1
s5: t5=t2*p1
s6: t6=t4+p2
s7: t7=t3*p1
s8: t8=t4+5

MACHINE INSTRUCTION
PROGRAM

| | | | |
|---|---|---|---|
| s1: | mov | D2, D0 | 1 |
| | add | D3, D0 | 1 |
| | mov | D0, E0 | 2 |
| s2: | mov | D2, E1 | 2 |
| | sub | D3, E1 | 3 |
| s3: | mov | D2, E2 | 2 |
| | mul | D3, E2 | 3 |
| s4: | mov | D2, E3 | 2 |
| | add | E0, E3 | 3 |
| s5: | mov | D2, E4 | 2 |
| | mul | E1, E4 | 3 |
| s6: | mov | D3, E5 | 2 |
| | add | E3, E5 | 3 |
| s7: | mov | D2, E6 | 2 |
| | mul | E2, E6 | 3 |
| s8: | mov | E3, D0 | 2 |
| | add | 5, D0 | 2 |
| | mov | D0, E7 | 2 |

40byte

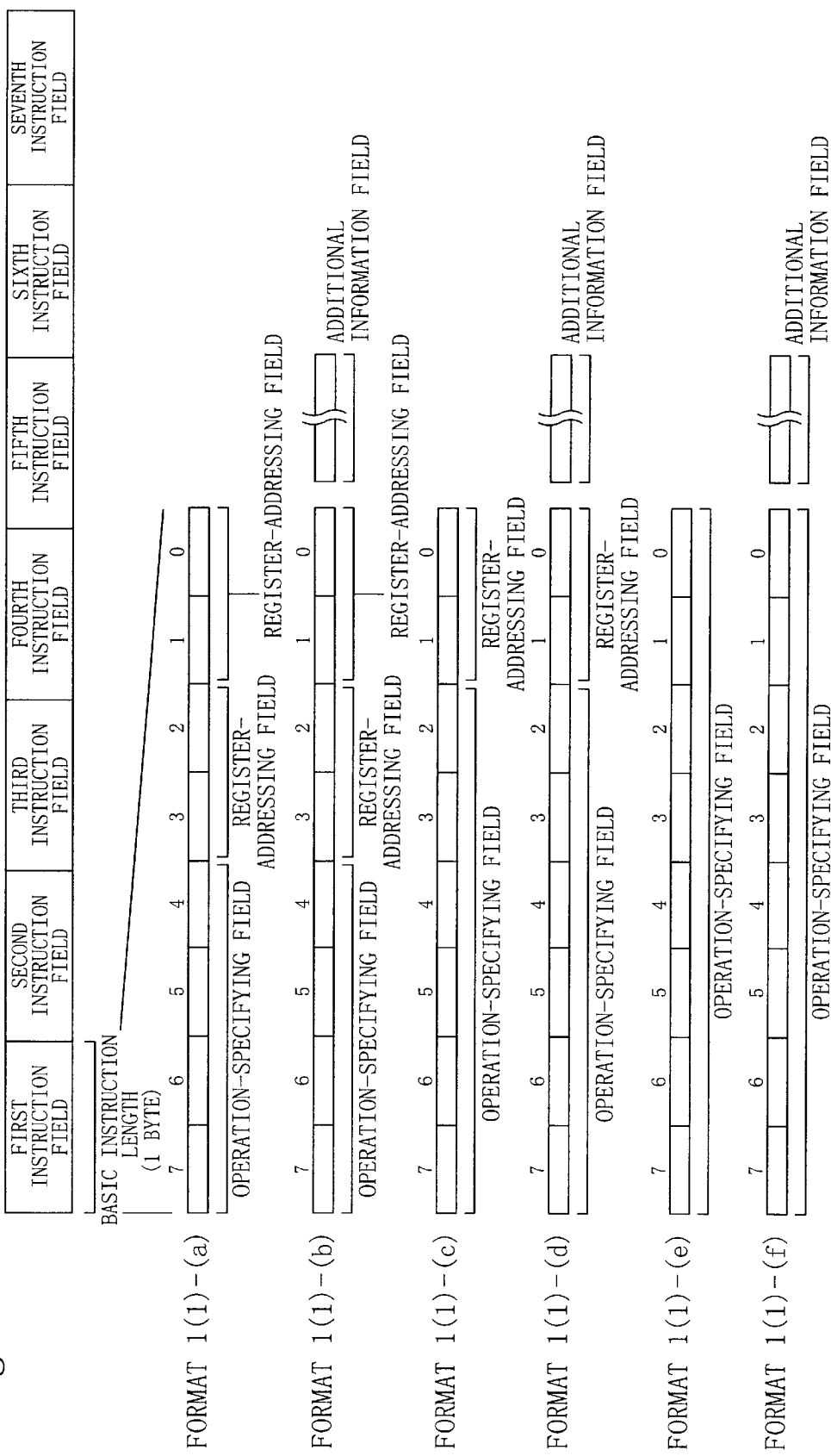

Fig. 11

FIRST INSTRUCTION FORMAT (1)-(a)
ADD Dm,Dn          : ADD
CMP Dm,Dn          : COMPARE
CMP Am,An          : COMPARE
MOV (Am),Dn        : TRANSFER FROM MEMORY TO REGISTER (LOAD)
MOV Dm,(An)        : TRANSFER FROM REGISTER TO MEMORY (STORE)
MOV Dm,Dn          : TRANSFER FROM REGISTER TO REGISTER
MOV Am,An          : TRANSFER FROM REGISTER TO REGISTER
...

FIRST INSTRUCTION FORMAT (1)-(b)
...

FIRST INSTRUCTION FORMAT (1)-(c)
CLR Dm             : CLEAR DATA TO 0
INC Dm             : INCREASE DATA BY 1
INC An             : INCREASE DATA BY 1
EXTB Dm            : EXTEND SIGNED BYTE DATA INTO WORD DATA
EXTUB Dm           : EXTEND UNSIGNED BYTE DATA INTO WORD DATA
EXTH Dm            : EXTEND SIGNED HALF-WORD DATA INTO WORD DATA
EXTHU Dm           : EXTEND UNSIGNED HALF-WORD DATA INTO WORD DATA
MOV SP,An          : TRANSFER STACK POINTER (SP) TO REGISTER
...

FIRST INSTRUCTION FORMAT (1)-(d)
ADD imm8,An        : ADD 8-BIT IMMEDIATE VALUE
ADD imm8,Dn        : ADD 8-BIT IMMEDIATE VALUE
MOV imm16,An       : TRANSFER 16-BIT IMMEDIATE VALUE
MOV imm16,Dn       : TRANSFER 16-BIT IMMEDIATE VALUE
MOV (abs16),Dn     : TRANSFER FROM MEMORY TO REGISTER (LOAD) BY ADDRESSING WITH 16-BIT ABSOLUTE VALUE
MOVBU (abs16),Dn   : TRANSFER ZERO-EXTENDED BYTE DATA FROM MEMORY TO REGISTER (LOAD)
                     BY ADDRESSING WITH 16-BIT ABSOLUTE VALUE
MOVHU (abs16),Dn   : TRANSFER ZERO-EXTENDED HALF-WORD DATA FROM MEMORY TO REGISTER (LOAD)
                     BY ADDRESSING WITH 16-BIT ABSOLUTE VALUE
MOV Dm,(abs16)     : TRANSFER FROM REGISTER TO MEMORY (STORE) BY ADDRESSING WITH 16-BIT ABSOLUTE VALUE
MOVBU Dm,(abs16)   : TRANSFER ZERO-EXTENDED BYTE DATA FROM REGISTER TO MEMORY (STORE)
                     BY ADDRESSING WITH 16-BIT ABSOLUTE VALUE
MOVHU Dm,(abs16)   : TRANSFER ZERO-EXTENDED HALF-WORD DATA FROM REGISTER TO MEMORY (STORE)
                     BY ADDRESSING WITH 16-BIT ABSOLUTE VALUE
MOV (disp8,SP),An  : TRANSFER FROM MEMORY TO REGISTER (LOAD) BY ADDRESSING USING STACK POINTER (SP) WITH DISPLACEMENT
MOV (disp8,SP),Dn  : TRANSFER FROM MEMORY TO REGISTER (LOAD) BY ADDRESSING USING STACK POINTER (SP) WITH DISPLACEMENT
MOV Am,(disp8,SP)  : TRANSFER FROM REGISTER TO MEMORY (STORE) BY ADDRESSING USING STACK POINTER (SP) WITH DISPLACEMENT
MOV Dm,(disp8,SP)  : TRANSFER FROM REGISTER TO MEMORY (STORE) BY ADDRESSING USING STACK POINTER (SP) WITH DISPLACEMENT
...

FIRST INSTRUCTION FORMAT (1)-(e)
NOP                : NO OPERATION
LOOP #CC           : LOOP CONTROL INSTRUCTION
...

FIRST INSTRUCTION FORMAT (1)-(f)
BR #CC(disp8,PC)   : CONDITIONAL BRANCH OF PC WITH DISPLACEMENT
JMP (disp8,PC)     : UNCONDITIONAL BRANCH OF PC WITH DISPLACEMENT
...

Fig. 13

FIRST INSTRUCTION FORMAT (2)-(a)
  SUB Dm,Dn       : SUBTRACT
  MOV(Am),An     : TRANSFER FROM MEMORY TO REGISTER (LOAD)
  MOV Am,(An)    : TRANSFER FROM REGISTER TO MEMORY (STORE)
  ...

FIRST INSTRUCTION FORMAT (2)-(b)
  MOV(Ai,Dn),Dn  : TRANSFER FROM MEMORY TO REGISTER (LOAD)
  ...                INDIRECTLY BY WAY OF INDEXED REGISTER

FIRST INSTRUCTION FORMAT (2)-(c)
  ...

FIRST INSTRUCTION FORMAT (2)-(d)
  ADD imm16,An   : ADD 16-BIT IMMEDIATE VALUE
  ADD imm16,Dn   : ADD 16-BIT IMMEDIATE VALUE
  ...

FIRST INSTRUCTION FORMAT (2)-(e)
  RTI              : RETURN FROM INTERRUPT STATE
  ...

FIRST INSTRUCTION FORMAT (2)-(f)
  ...

| NAME OF REGISTER | BIT ASSIGNMENT ON INSTRUCTION CODE | NUMBER OF PHYSICAL REGISTER | NAME OF PHYSICAL REGISTER |
|---|---|---|---|
| A0 | 00 | 00 | ADDRESS REGISTER |
| A1 | 01 | 01 | ADDRESS REGISTER |
| A2 | 02 | 02 | ADDRESS REGISTER |
| A3 | 03 | 03 | ADDRESS REGISTER |
| D0 | 00 | 00 | ADDRESS REGISTER |
| D1 | 01 | 01 | ADDRESS REGISTER |
| D2 | 02 | 02 | ADDRESS REGISTER |
| D3 | 03 | 03 | ADDRESS REGISTER |

Fig. 17

SECOND INSTRUCTION FORMAT (a)
```
  ADD Rm,Rn         : ADD
  SUB Rm,Rn         : SUBTRACT
  CMP Rm,Rn         : COMPARE
  MOV(Rm),Rn        : TRANSFER FROM MEMORY TO REGISTER (LOAD)
  MOV Rm,(Rn)       : TRANSFER FROM REGISTER TO MEMORY (STORE)
  MOV Rm,Rn         : TRANSFER FROM REGISTER TO REGISTER
  ...
```

SECOND INSTRUCTION FORMAT (b)
```
  ADD Rm,Rn,Rd      : ADD
  SUB Rm,Rn,Rd      : SUBTRACT
  MOV(Ri,Rm),Rn     : TRANSFER FROM MEMORY TO REGISTER (LOAD)
                      INDIRECTLY BY WAY OF INDEXED REGISTER
  ...
```

SECOND INSTRUCTION FORMAT (c)
```
  ...
```

SECOND INSTRUCTION FORMAT (d)
```
  ADD imm 16,Rn     : ADD 16-BIT IMMEDIATE VALUE
  ADD imm 16,Rn     : ADD 16-BIT IMMEDIATE VALUE
  MOV(disp8,SP),Rn  : TRANSFER FROM MEMORY TO REGISTER (LOAD)
                      BY ADDRESSING USING STACK POINTER (SP) WITH DISPLACEMENT
  MOV Rm,(disp8,SP) : TRANSFER FROM REGISTER TO MEMORY (STORE)
  ...                 BY ADDRESSING USING STACK POINTER (SP) WITH DISPLACEMENT
```

| NAME OF REGISTER | BIT ASSIGNMENT ON INSTRUCTION CODE | NUMBER OF PHYSICAL REGISTER | NAME OF PHYSICAL REGISTER |
|---|---|---|---|
| A0 | 00 | 1000 | GENERAL-PURPOSE REGISTER |
| A1 | 01 | 1001 | GENERAL-PURPOSE REGISTER |
| A2 | 10 | 1010 | GENERAL-PURPOSE REGISTER |
| A3 | 11 | 1011 | GENERAL-PURPOSE REGISTER |
| D0 | 00 | 1100 | GENERAL-PURPOSE REGISTER |
| D1 | 01 | 1101 | GENERAL-PURPOSE REGISTER |
| D2 | 10 | 1110 | GENERAL-PURPOSE REGISTER |
| D3 | 11 | 1111 | GENERAL-PURPOSE REGISTER |
| E0 | | | |
| E1 | | | |
| E2 | | | |
| E3 | | | |
| E4 | | | |
| E5 | | | |
| E6 | | | |
| E7 | | | |

Fig. 20

| NAME OF REGISTER | BIT ASSIGNMENT ON INSTRUCTION CODE | NUMBER OF PHYSICAL REGISTER | NAME OF PHYSICAL REGISTER |
|---|---|---|---|
| A0 | 1000 | 1000 | GENERAL-PURPOSE REGISTER |
| A1 | 1001 | 1001 | GENERAL-PURPOSE REGISTER |
| A2 | 1010 | 1010 | GENERAL-PURPOSE REGISTER |
| A3 | 1011 | 1011 | GENERAL-PURPOSE REGISTER |
| D0 | 1100 | 1100 | GENERAL-PURPOSE REGISTER |
| D1 | 1101 | 1101 | GENERAL-PURPOSE REGISTER |
| D2 | 1110 | 1110 | GENERAL-PURPOSE REGISTER |
| D3 | 1111 | 1111 | GENERAL-PURPOSE REGISTER |
| E0 | 0000 | 0000 | GENERAL-PURPOSE REGISTER |
| E1 | 0001 | 0001 | GENERAL-PURPOSE REGISTER |
| E2 | 0010 | 0010 | GENERAL-PURPOSE REGISTER |
| E3 | 0011 | 0011 | GENERAL-PURPOSE REGISTER |
| E4 | 0100 | 0100 | GENERAL-PURPOSE REGISTER |
| E5 | 0101 | 0101 | GENERAL-PURPOSE REGISTER |
| E6 | 0110 | 0110 | GENERAL-PURPOSE REGISTER |
| E7 | 0111 | 0111 | GENERAL-PURPOSE REGISTER |

COMPILER

BACKGROUND OF THE INVENTION

The present invention relates to a compiler for translating a source program written in a high-level programming language into an object program written in a machine language.

In recent years, programmers have been trying very hard to improve the efficiency in developing a program by writing a program in a high-level programming language like C. The use of a high-level programming language enables a programmer to arbitrarily define a desired number of steps of holding, computing or transferring numerical values in a program using variables. That is to say, a programmer can freely write a program. During this process, a program written in such a high-level programming language (i.e., source program, which is also often called a "source code file") should be compiled, or translated, by a compiler into an object program written in a computer-executable machine language (which is often called an "object code file"). The steps in the machine-executable object program are represented by machine instructions, which require registers or memories as operands. Accordingly, variables should be allocated to these registers or memories. Such allocation processing is called "resource allocation". If optimum resource allocation has been performed successfully, then the code size of the object program can be minimized.

In general, allocating respective variables to registers turns out to be more advantageous in terms of code size and execution time rather than allocating them to memories. However, generally speaking, the number of available registers is relatively small. Thus, the degree of optimization achievable in the resource allocation solely depends on how efficiently variables can be allocated to register resources to execute a machine instruction using the registers as operands. In accordance with a conventional technique of optimizing resources allocation, a plurality of variables, allocable to the same register, are identified based on the respective ranges where the stored values of these variables are alive (in this specification, such a range will be called "variable life range"). Based on the results of this identification, the variables are allocated to the resources.

The present inventors proposed a data processor using the following two types of instruction formats and register models for the execution of instructions in Japanese Patent Application No. 10-59680.

FIGS. 10 through 20 outline the first instruction format.

In the first instruction format, a variable-length instruction with a minimum instruction length of 1 byte is described. A 2-bit field is used as a register-addressing field. Accordingly, four registers can be specified with one register-addressing field. In this architecture, four address registers and four data registers are defined. By separately using the address registers or the data registers responsive to a specific instruction, eight registers can be used in total in executing an instruction.

FIG. 10 illustrates a bit assignment for the first instruction format (1) in which a first instruction field composed of 1 byte, equal to the minimum instruction length, consists of an operation-specifying field and an arbitrary number of register-addressing fields. Specific examples of this format will be described below.

In an exemplary first instruction format (1)-(a), the first instruction field includes two 2-bit register-addressing fields and is composed of 1 byte, which is the minimum instruction length. And two operands can be specified in accordance with this format.

In another exemplary first instruction format (1)-(b), the first instruction field includes two 2-bit register-addressing fields, and an additional information field is further provided. Thus, the instruction length in accordance with this format is 2 bytes or more in total.

In still another exemplary first instruction format (1)-(c), the first instruction field includes one 2-bit register-addressing field and is composed of 1 byte, which is the minimum instruction length. And one operand can be specified in accordance with this format.

In yet another exemplary first instruction format (1)-(d), the first instruction field includes one 2-bit register-addressing field, and an additional information field is further provided. Thus, the instruction length in accordance with this format is 2 bytes or more in total.

In yet another exemplary first instruction format (1)-(e), the first instruction field includes no register-addressing fields and is composed of 1 byte, which is the minimum instruction length. Accordingly, in accordance with this format, no operands can be specified using addresses.

In yet another exemplary first instruction format (1)-(f), the first instruction field includes no register-addressing fields but an additional information field is further provided. Thus, the instruction length in accordance with this format is 2 bytes or more in total.

FIG. 11 illustrates part of a list of specific instructions for respective types of bit assignment shown in FIG. 10. In FIG. 11, instruction mnemonics are shown on the left and the operations performed to execute these instructions are shown on the right.

FIG. 12 illustrates a bit assignment for a first instruction format (2) in which a first instruction field composed of 1 byte, i.e., the minimum instruction length, consists of an instruction-length-specifying field and a second instruction field consists of an operation-specifying field and an arbitrary number of register-addressing fields. Specific examples of this format will be described in detail below.

In an exemplary first instruction format (2)-(a), the second instruction field includes two 2-bit register-addressing fields and the first and second instruction fields are composed of 2 bytes. And two operands can be specified in accordance with this format.

In another exemplary first instruction format (2)-(b), the second instruction field includes two 2-bit register-addressing fields, and an additional information field is further provided. Thus, the instruction length in accordance with this format is 3 bytes or more in total.

In still another exemplary first instruction format (2)-(c), the second instruction field includes one 2-bit register-addressing field and the first and second instruction fields are composed of 2 bytes. And one operand can be specified in accordance with this format.

In yet another exemplary first instruction format (2)-(d), the second instruction field includes one 2-bit register-addressing field, and an additional information field is further provided. Thus, the instruction length in accordance with this format is 3 bytes or more in total.

In yet another exemplary first instruction format (2)-(e), the second instruction field includes no register-addressing fields and the first and second instruction fields are composed of 2 bytes. Accordingly, in accordance with this format, no operands can be specified using addresses.

In yet another exemplary first instruction format (2)-(f), the second instruction field includes no register-addressing fields but an additional information field is further provided. Thus, the instruction length in accordance with this format is 3 bytes or more in total.

FIG. 13 illustrates part of a list of specific instructions for respective types of bit assignment shown in FIG. 12. In FIG. 13, instruction mnemonics are shown on the left and the operations performed to execute these instructions are shown on the right.

Accordingly, in accordance with the first instruction format shown in FIGS. 10 through 13, the instruction length of the first instruction field is used as a basic instruction length to specify a variable-length instruction. And an instruction can be described in this format to have a length N times as large as the basic instruction length and equal to or less than the maximum instruction length, which is M times as large as the basic instruction length (where N and M are both positive integers and $1 \leq N \leq M$). Since the minimum instruction length is 1 byte, this instruction format is suitable for downsizing a program.

FIG. 14 illustrates a first register file 220 included in the data processor proposed by the present inventors. The first register file 220 includes: four address registers A0 through A3; four data registers D0 through D3; a stack pointer (SP) 223; a processor status word (PSW) 224 for holding internal status information and control information; and a program counter (PC) 225.

FIG. 15 is a table illustrating accessing the address and data registers A0 through A3 and D0 through D3 included in the first register file 220 in greater detail. Specifically, this is a table of correspondence among name of a register specified by an instruction, bit assignment on an instruction code specified in a register-addressing field, and number and name of a physical register to be accessed.

In the first instruction format, the set of instruction addressing fields specified by respective instructions to access the four address registers A0 through A3 is the same as the set of instruction addressing fields specified by respective instructions to access the four data registers D0 through D3 as shown in FIG. 15. That is to say, the same 2-bit instruction addressing field is used to address a desired register, and it is determined by the operation of the instruction itself whether an address register or a data register should be accessed.

Next, respective bit assignments for a second instruction format, which is added as an extension to the first instruction format shown in FIGS. 10 and 12, i.e., the basic instruction format of this architecture, will be described with reference to FIG. 16.

In each of the bit assignments shown in FIG. 16 for the second instruction format, a first instruction field, composed of 1 byte, which is the minimum instruction length, consists of an instruction-length-specifying field. And second and third instruction fields consist of an operation-specifying field and an arbitrary number of register-addressing fields. In accordance with the second instruction format, each register-addressing field is composed of 4 bits. Specific examples of this format will be described in detail below.

In an exemplary second instruction format (a), the third instruction field includes two 4-bit register-addressing fields and the first through third instruction fields are composed of 3 bytes in total. And two operands can be specified in accordance with this format.

In another exemplary second instruction format (b), the third instruction field also includes two 4-bit register-addressing fields, and an additional information field is further provided. Thus, the instruction length in accordance with this format is 4 bytes or more in total.

In still another exemplary second instruction format (c), the third instruction field includes one 4-bit register-addressing field and the first through third instruction fields are composed of 3 bytes in total. And one operand can be specified in accordance with this format.

In yet another exemplary second instruction format (d), the third instruction field includes one 4-bit register-addressing field, and an additional information field is further provided. Thus, the instruction length in accordance with this format is 4 bytes or more in total.

Thus, in accordance with the second instruction format, the instruction length of the first instruction field is also used as a basic instruction length. And an instruction can be described in this format to have a variable length N times as large as the basic instruction length and equal to or less than the maximum instruction length, which is M times as large as the basic instruction length (where N and M are both positive integers and $1 \leq N \leq M$).

FIG. 17 illustrates part of a list of specific instructions for respective types of bit assignment shown in FIG. 16. In FIG. 17, instruction mnemonics are shown on the left and the operations performed to execute these instructions are shown on the right. The mnemonic Rm, Rn or Ri indicates the address of a specified register. In this case, a second register file shown in FIG. 18 is defined and any of sixteen general-purpose registers, namely, four address registers A0 through A3, four data registers D0 through D3 and eight extended registers E0 through E7, may be specified. The second register file 120 further includes: a stack pointer (SP) 122; a processor status word (PSW) 123 for holding internal status information and control information; and a program counter (PC) 124.

FIG. 19 is a table of correspondence among name of a register specified during the execution of an instruction defined in the first instruction format, bit assignment on an instruction code specified in a register-addressing field, and number and name of a physical register to be accessed. In accordance with the first instruction format, each register-addressing field is composed of only 2 bits. However, in this case, there are sixteen general-purpose registers, each of which should be accessed using a 4-bit address. Accordingly, address conversion should be performed. For example, in accessing an address register A0 and a data register D1, "1000" and "1101" should be produced as respective physical register numbers and then output to a file 121 of general-purpose registers.

FIG. 20 is a table of correspondence among name of a register specified during the execution of an instruction defined in the second instruction format, bit assignment on an instruction code specified in a register-addressing field, and number and name of a physical register to be accessed. In accordance with the second instruction format, each register-addressing field is composed of 4 bits, which is used as a physical register number as it is.

If variables are simply allocated preferentially to registers rather than memories as is done in a conventional compiler, then the data processor proposed by the present inventors in Japanese Laid-Open Publication No. 10-59680 poses the following problems:

1) A total length of instructions differs depending on whether variables, allocated to the first register file (including register resources), are processed in the first instruction format or variables, allocated to the second register file, are processed in the second instruction format. Accordingly, if these two types of variables are processed equally without prioritizing their allocation at all, then the resulting code size of instructions cannot be minimized. That is to say, in a conventional compiler, it has not been taken into any consideration whether the variables should be preferentially allocated to the first or second register file. For example, if the variables are sequentially allocated to the second register file and processed in accordance with the second instruction format, then the resulting code size becomes longer. This is because the length of one instruction defined by the second instruction format is longer than that defined by the first instruction format.

2) In executing a set of instructions including a data transfer instruction from a memory to a register, the number of instructions where variables are processed in the first instruction format is larger than the number where the variables are processed in the second instruction format. But the total length of instructions in the first instruction format may be shorter than that in the second instruction format. Accordingly, even if variables are simply allocated preferentially to register resources rather than memories, the code size cannot be minimized.

SUMMARY OF THE INVENTION

An object of the present invention is providing a compiler that can produce an object program with a minimum code size for a processor of the type using different types of register resources and defining variable instruction lengths in accordance with the instruction formats.

In order to achieve this object, the compiler of the present invention produces an object program by allocating variables, which are referred to frequently, to register resources accessible in an instruction format with the shorter instruction length and by processing these variables in that instruction format.

Specifically, a compiler according to the present invention is adapted to translate a source program, including a plurality of instructions, into an object program. The compiler includes: first instruction length calculating means for calculating a total length of the instructions where variables for the source program are allocated to a first type of register resources in accordance with a first instruction format; and second instruction length calculating means for calculating a total length of the instructions where the variables are allocated to a second type of register resources in accordance with a second instruction format. The length of one instruction defined by the second instruction format is different from that defined by the first instruction format. The variables are allocated to respectively appropriate ones of the register resources based on the results of calculation derived by the first and second instruction length calculating means.

In one embodiment of the present invention, the variables are allocated to respectively appropriate ones of the register resources to make an ultimate total length of the instructions as short as possible based on the results of calculation derived by the first and second instruction length calculating means.

In another embodiment, some of the variables for the source program, which are referred to relatively frequently, are preferentially allocated to the first type of register resources accessible in the first instruction format.

In still another embodiment, in manipulating some of the variables for the source program, which have been allocated to the first type of register resources, the manipulation is described preferentially in the first instruction format.

In still another embodiment, some of the variables for the source program, which are referred to relatively frequently, and other variables used along with the former variables are preferentially allocated to the first type of register resources.

A system according to the present invention is adapted to minimize the code size of an object program executable on a computer. The object program has been translated from a source program using a compiler and the source program in-cludes a plurality of instructions. The compiler includes: first instruction length calculating means for calculating a total length of the instructions where variables for the source program are allocated to a first type of register resources in accordance with a first instruction format; and second instruction length calculating means for calculating a total length of the instructions where the variables are allocated to a second type of register resources in accordance with a second instruction format. The length of one instruction defined by the second instruction format is different from that defined by the first instruction format. The variables are allocated to respectively appropriate ones of the register resources based on the results of calculation derived by the first and second instruction length calculating means.

A computer-readable storage medium according to the present invention has stored thereon an object program that has been translated using a compiler from a source program including a plurality of instructions. The object program includes not only instructions described in a first instruction format using a first type of register resources, but also instructions described in a second instruction format using a second type of register resources. The length of one instruction defined by the second instruction format is different from that defined by the first instruction format. Each said instruction is identified as being in the first or second instruction format by a value in a particular field in the instruction.

According to the present invention, a processor, using different types of register resources and defining variable instruction lengths in accordance with the types of instruction formats, is supposed to be used. The inventive compiler calculates a total length of instructions in both cases where respective variables are allocated to a first type of register resources with the first instruction format and where the variables are allocated to a second type of register resources with the second instruction format. Based on these results of calculation, the variables are preferentially allocated to appropriate register resources to make the ultimate total length of instructions as short as possible. As a result, the compiler can produce an object program with a minimized code size.

BRIEF DESCRIPTION OF THE DRAWINGS

FIG. 6 illustrates an exemplary allocation of variables to respective resources and an associated machine instruction program in accordance with a conventional method.

FIG. 7 illustrates an exemplary allocation of variables to respective resources and an associated machine instruction program according to the present invention.

FIG. 8 illustrates another exemplary allocation of variables to respective resources and an associated machine instruction program according to the present invention.

FIG. 9 illustrates still another exemplary allocation of variables to respective resources and an associated machine instruction program according to the present invention.

FIG. 10 is a diagram illustrating a first instruction format (1) applicable to the compiler of the present invention run by a data processor.

FIG. 11 illustrates part of a list of specific instructions to be executed by the data processor in accordance with the first instruction format (1).

FIG. 13 illustrates part of a list of specific instructions to be executed by the data processor in accordance with the first instruction format (2).

FIG. 17 illustrates part of a list of specific instructions to be executed by the data processor in accordance with the second instruction format.

FIG. 20 is a table of correspondence illustrating respective relationships among names, numbers and types of registers in the register file and associated bit assignments where the data processor executes instructions in the second instruction format.

DESCRIPTION OF THE PREFERRED EMBODIMENTS

A compiler according to the present invention is adapted to produce a set of machine instructions using the data processor that is compatible with two different types of instruction formats as disclosed by the present inventors in Japanese Patent Application No. 10-59680 identified above. Specifically, the data processor can process a set of machine instructions by using different types of register resources and defining variable instruction lengths in accordance with the formats of the specific instructions.

Hereinafter, preferred embodiments of the present invention will be described with reference to FIGS. 1 through 5.

Figure 1:
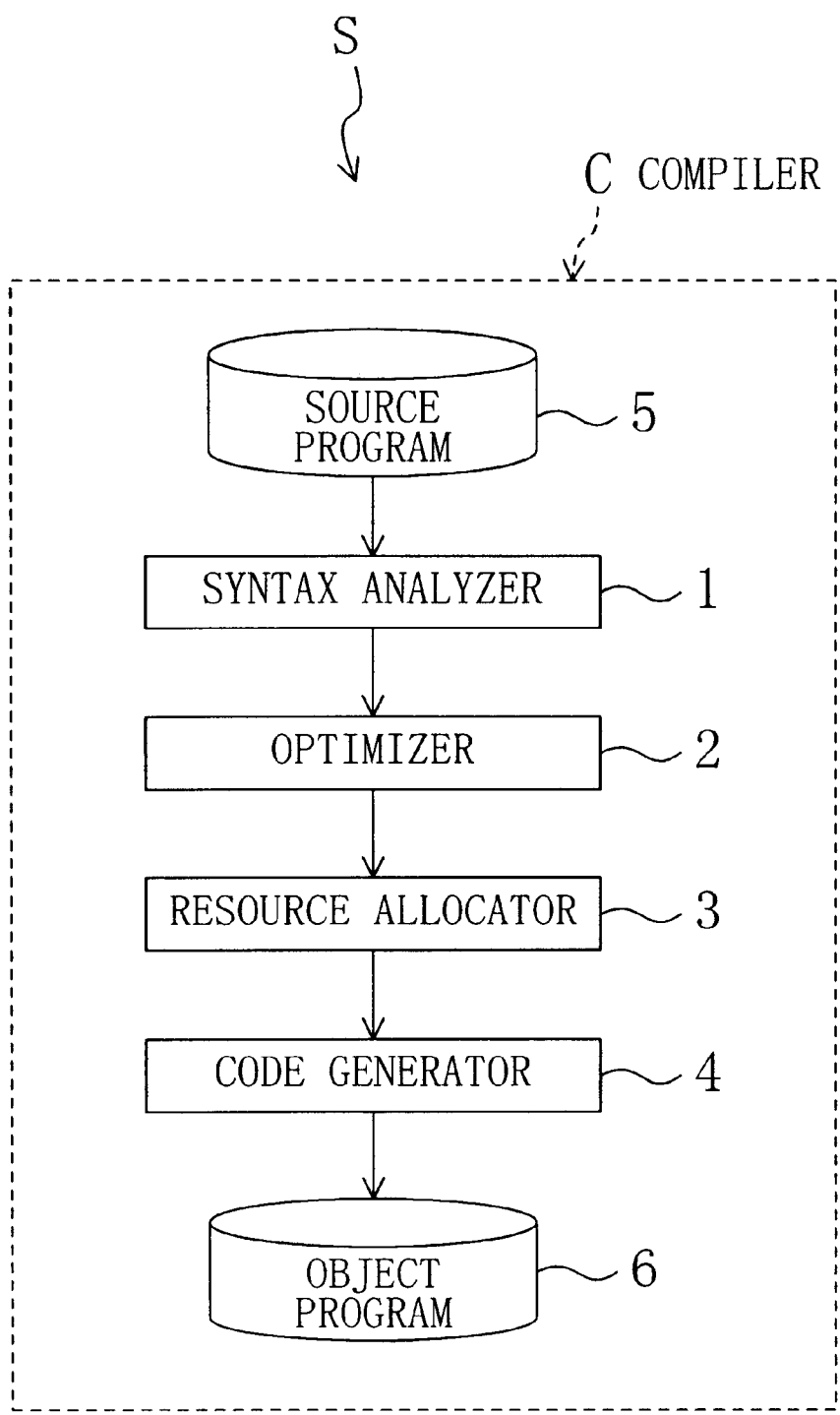
FIG. 1 is a block diagram illustrating a configuration of a compiler according to an exemplary embodiment of the present invention.

FIG. 1 illustrates a configuration of a compiler C included in a computer system S according to the present invention. The compiler C includes a syntax analyzer 1, an optimizer 2, a resource allocator 3 and a code generator 4.

The syntax analyzer 1 performs lexical analysis, syntax analysis and semantic analysis on a source program 5 stored as a file. The results of these analyses are output as an intermediate language program.

The optimizer 2 optimizes the intermediate language program in order to cut down on the size of an object program 6 ultimately generated and to shorten the execution time.

The resource allocator 3 identifies life ranges of respective variables in a program, allocates various resources, including registers and memories, to these variables within these life ranges, and also allocates an optimum instruction to an associated operation.

Based on the results of allocation obtained by the resource allocator 3, the code generator 4 converts the optimized intermediate language program into a set of machine instructions compatible with a target machine and outputs the instruction set as the object program 6.

It should be noted that the syntax analyzer 1, the optimizer 2 and the code generator 4 are all implemented as well-known software programs that run on a computer system, and the detailed description thereof will be omitted herein.

Figure 2:
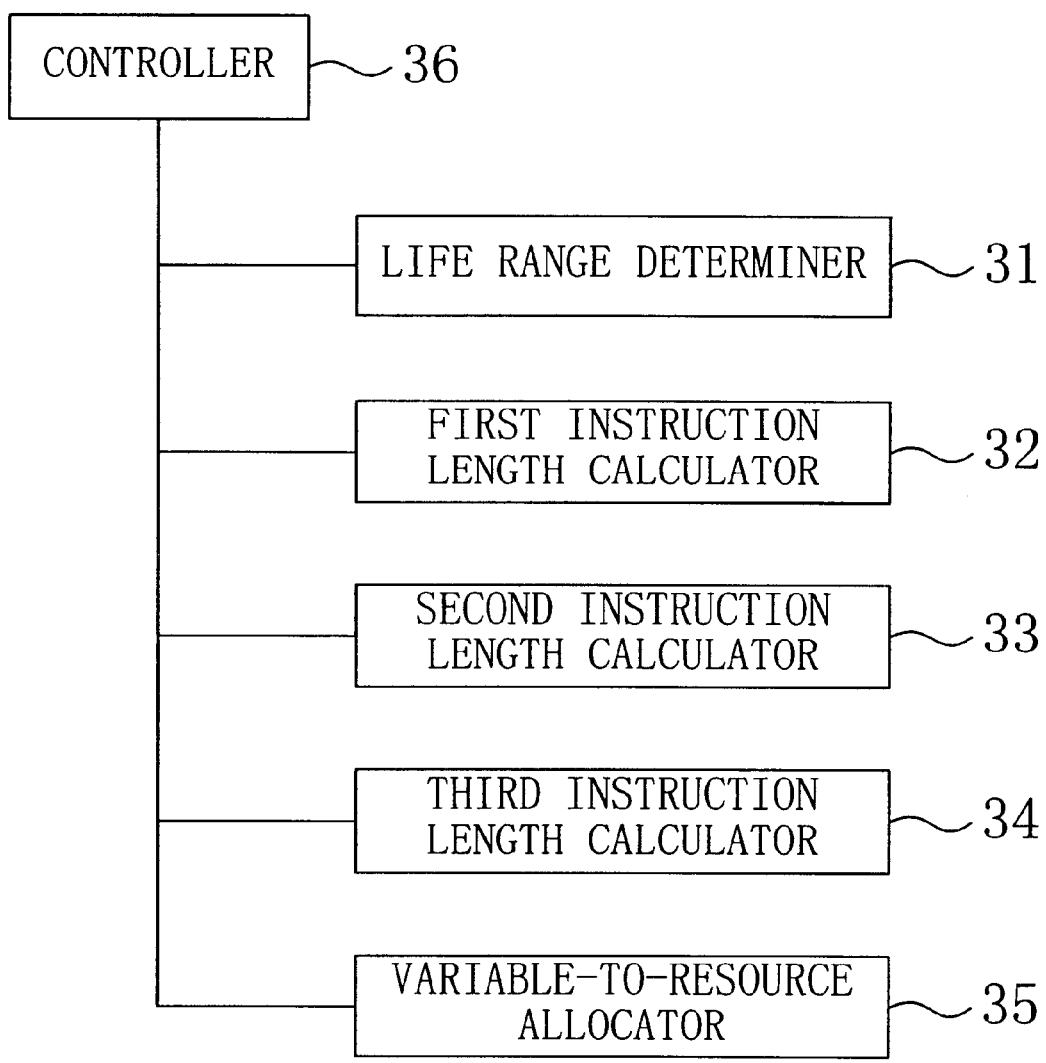
FIG. 2 is a block diagram illustrating a configuration of a resource allocator 3 in the compiler shown in FIG. 1.

FIG. 2 illustrates a configuration of the resource allocator 3 of the compiler according to this embodiment of the present invention. As shown in FIG. 2, the resource allocator 3 includes: a life range determiner 31; first, second and third instruction length calculators 32, 33 and 34; a variable-to-resource allocator 35; and a controller 36. The life range determiner 31 determines the life range of each variable. The first instruction length calculator 32 calculates the total length of a set of instructions that have been used to allocate the variables to respective registers in accordance with the first instruction format, in which only part of the registers are available. The second instruction length calculator 33 calculates the total length of a set of instructions that have been used to allocate the variables to respective registers in accordance with the second instruction format, in which all of the register resources are accessible. The third instruction length calculator 34 calculates the total length of a set of instructions that have been used to allocate the variables to respective memories. Based on the respective results obtained by the life range determiner 31 and the first, second and third instruction length calculators 32, 33 and 34, the variable-to-resource allocator 35 ultimately decides to which resources the variables should be allocated. And the controller 36 controls the other sections of the resource allocator 3.

Figure 3:
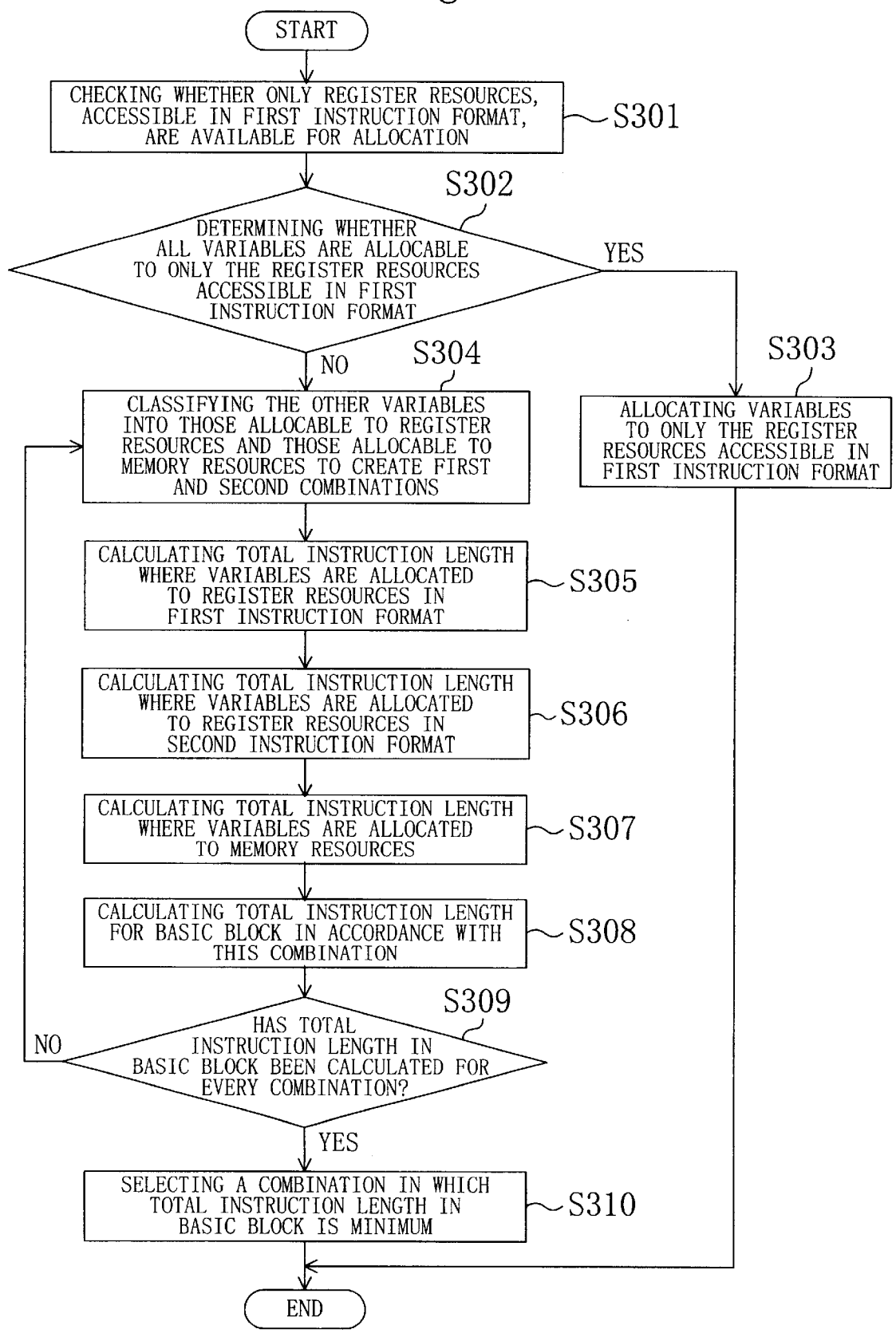
FIG. 3 is a flowchart illustrating the flow of resource allocation processing performed by the resource allocator in the compiler shown in FIG. 1.

The resource allocation operation of the compiler having such a configuration will be described with reference to the accompanying drawings. FIG. 3 is a flowchart illustrating the flow of resource allocation processing under the control of the controller 36 in this embodiment.

Figures 4, 5:
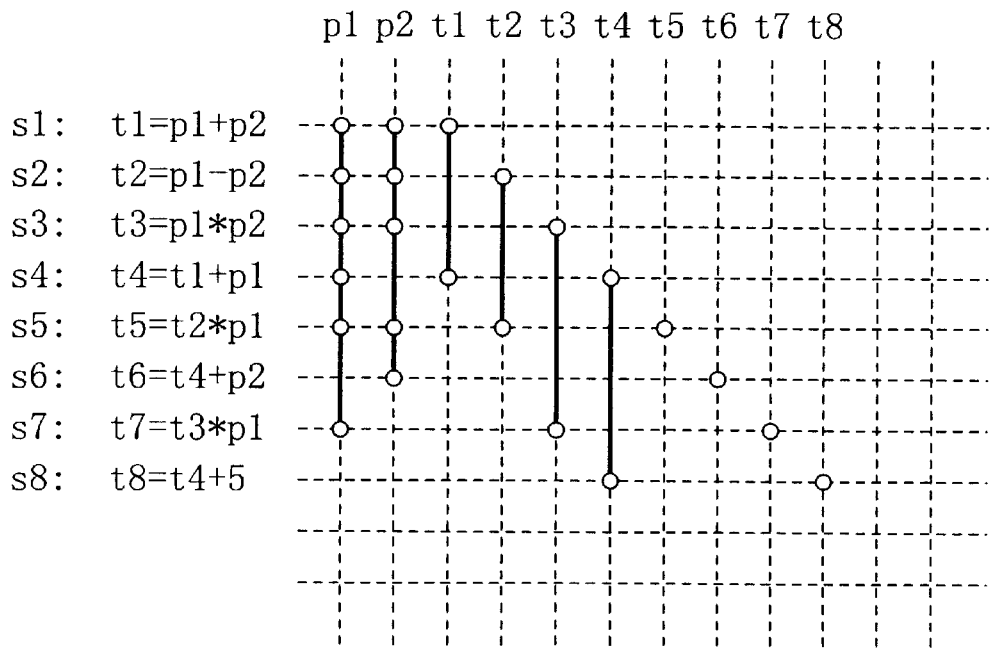
FIG. 4 illustrates an exemplary intermediate language program.
FIG. 5 illustrates life ranges and frequencies of reference of respective variables in the intermediate language program.
Figure 12:
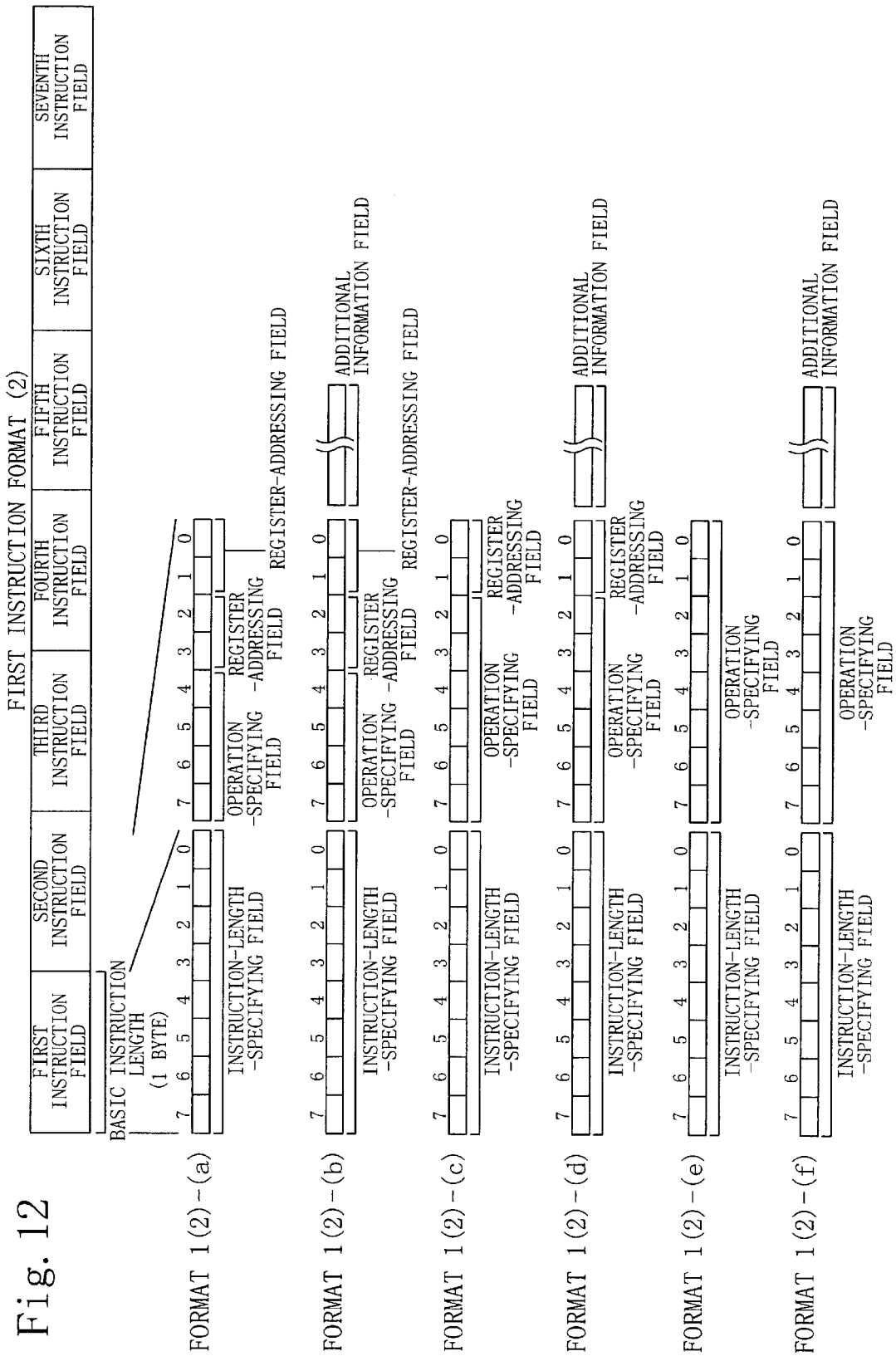
FIG. 12 is a diagram illustrating a first instruction format (2) executed by the data processor.
Figures 14, 15:
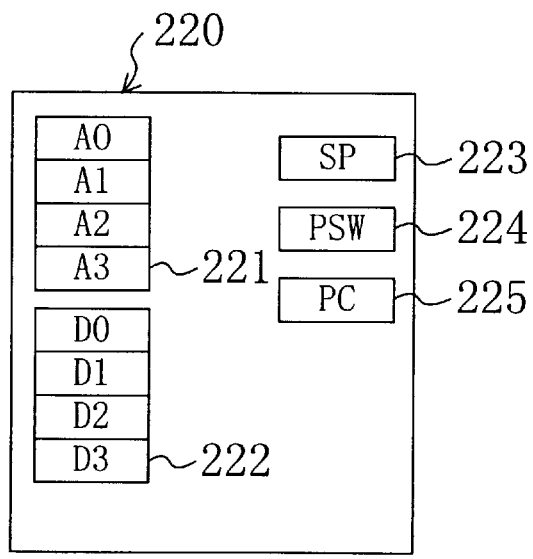
FIG. 14 is a block diagram illustrating an arrangement of registers in a first register file in the data processor.
FIG. 15 is a table of correspondence illustrating respective relationships among names, numbers and types of registers in the register file and associated bit assignments where the data processor executes instructions in the first instruction format.
Figure 16:
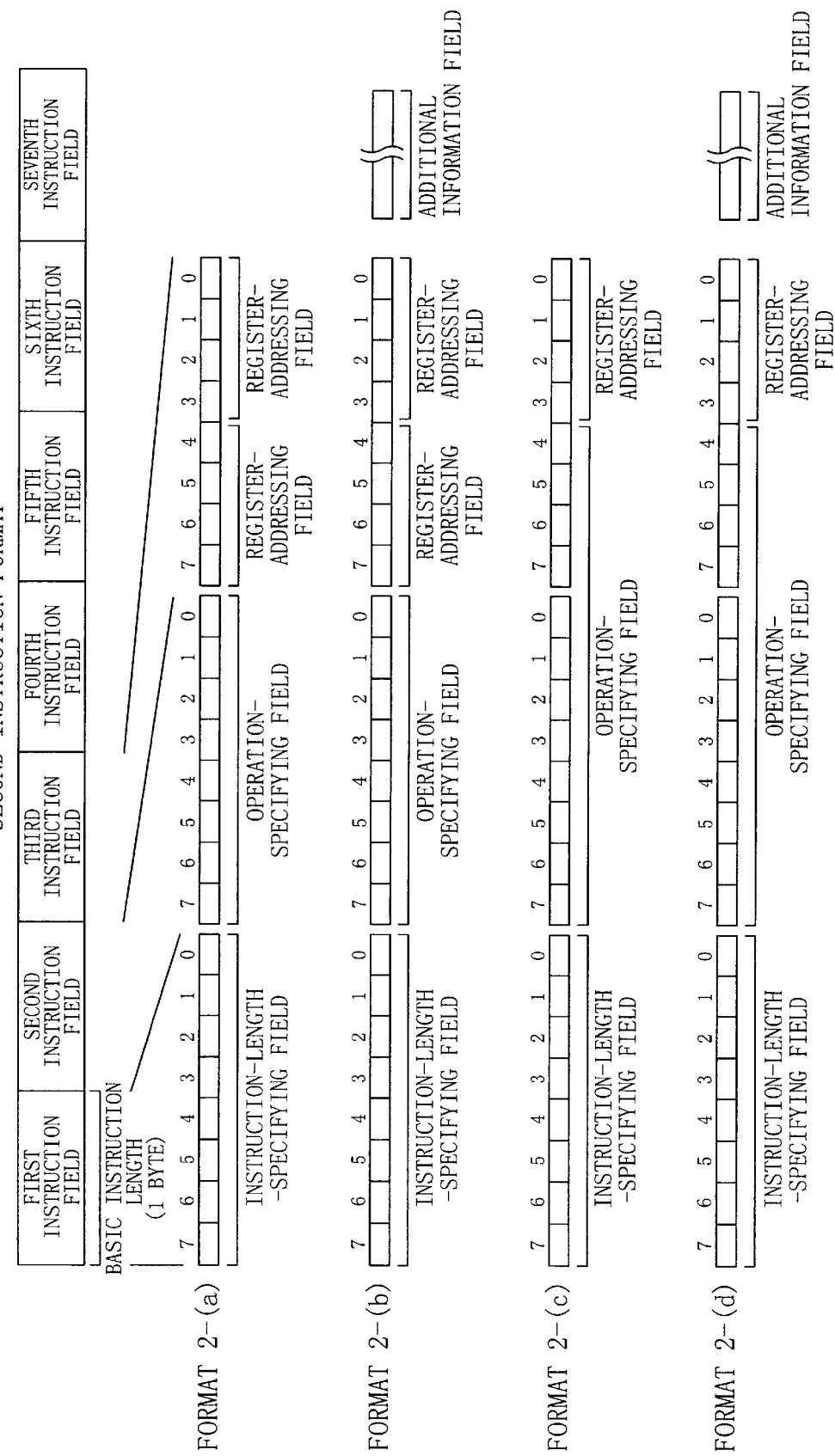
FIG. 16 is a diagram illustrating a second instruction format executed by the data processor.
Figures 18, 19:
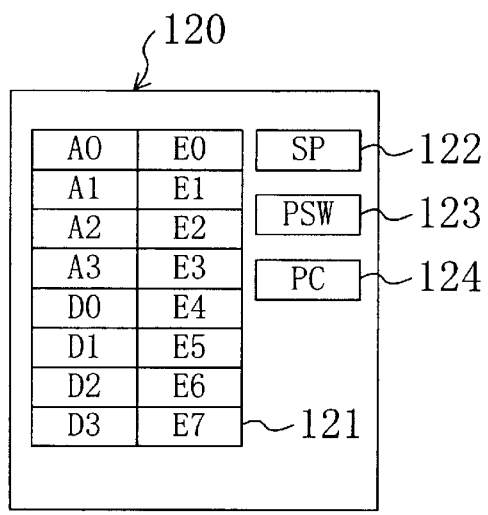
FIG. 18 is a block diagram illustrating an arrangement of registers in a register file in the data processor.
FIG. 19 is a table of correspondence illustrating respective relationships among names, numbers and types of registers in the register file and associated bit assignments where the data processor executes instructions in the first instruction format.

An exemplary intermediate code program to be subjected to the resource allocation by the compiler is shown in FIG. 4. Intermediate codes s1 through s8 shown in FIG. 4 are collectively regarded as a basic block to be subjected to the resource allocation. For the sake of simplicity, the resource allocation within the basic block will be exemplified in the following description. However, a similar statement applies to resource allocation processing on a program of a size larger than that of the basic block.

Also, the register resource allocation is supposed to be performed under the following conditions for the illustrative purpose only.

1) Among the register resources accessible in the first instruction format (i.e., address registers A0 through A3 and data registers D0 through D3), the address registers A0 through A3 are supposed to be used as pointers, not to store data and variables thereon.

2) Among the register resources accessible in the first instruction format (i.e., address registers A0 through A3 and data registers D0 through D3), the data registers D0 through D3 are all supposed to be usable for storing and manipulating data and variables thereon. However, two out of the three data registers, namely, D0 and D1, are supposed to be used as work registers, not to allocate variables thereto.

3) Among the register resources accessible in the second instruction format (i.e., address registers A0 through A3, data registers D0 through D3 and extended registers E0 through E7), the extended registers E0 through E7 are supposed to be freely usable for data or address storage.

It should be noted that these conditions are defined herein to simplify the discussion, not to limit the scope of the present invention in any way.

Hereinafter, exemplary resource allocation processing on the intermediate code program shown in FIG. 4 will be described with reference to the flowchart shown in FIG. 3.

First, in Step S301, life ranges and frequencies of reference are examined for all the variables within the basic block. In this case, only the register resources accessible in the first instruction format, namely, A0 through A3 and D0 through D3, are available for the register allocation. Based on the results of this examination, the variable-to-resource allocator 35 checks whether or not each of the register resources, accessible in the first instruction format, is available for allocation. In this case, the key point is not how to allocate the variables to these registers, but that the register resource allocation is performed only on the register resources accessible in the first instruction format. This is because the length of an instruction defined by the first instruction format is shorter than that defined by the second instruction format in executing the same operation.

Next, in Step S302, it is determined based on the results of checking in Step S301 whether or not all the variables are allocable to only the register resources accessible in the first instruction format.

If the answer to the inquiry in Step S302 is "YES", then the variables are allocated in Step S303 only to the register resources accessible in the first instruction format to end the resource allocation processing.

In general, there are a large number of variables within a basic block. Accordingly, in most cases, some of the variables cannot be allocated to the register resources accessible in the first instruction format. If it has been determined in Step S302 that not all the variables can be allocated to the register resources accessible in the first instruction format, then the allocation of some variables to the register resources accessible in the first instruction format is prioritized. Hereinafter, this prioritized allocation processing will be described in detail.

FIG. 5 illustrates life ranges and frequencies of reference of respective variables within the basic block, which are used to determine which variables are allocable to the register resources accessible in the first instruction format. According to the results shown in FIG. 5, p1 and p2, which are variables referred to most frequently, are preferably allocated to the registers D2 and D3 among the registers accessible in the first instruction format. In this case, it is determined based on the number of accessible register resources and life ranges and frequencies of reference of respective variables which variables are allocated to these registers. Herein, since the registers D0 and D1 cannot be used under the conditions described above, the available register resources are D2 and D3, to which the two variables, referred to most frequently, are allocated.

Then, in Step S304, the variable-to-resource allocator 35 classifies the remaining variables, which have not been successfully allocated to the register resources accessible in the first instruction format, into the following two groups. Specifically, the first group consists of variables that should be allocated to other register resources accessible in only the second instruction format, i.e., extended registers E0 through E7, and the second group consists of variables to be allocated to memory resources. The combination of these variables, which are allocated to respective registers and memories, will be called a "first combination (resource allocation)" in the following description.

Furthermore, in Step S304, if it has been determined that some variables should be allocated to register resources in accordance with the first combination, then the controller 36 creates a second combination (instruction allocation). Specifically, the controller 36 determines whether the first instruction format should be adopted using the work registers D0 and D1 or the second instruction format should be adopted without using these two registers D0 and D1. Exemplary second combinations associated with particular first combinations using the extended registers E0 through E7 and the registers D2 and D3 are illustrated in FIGS. 7 through 9, which will be referred to in detail later. Since the total instruction lengths of all possible combinations are ultimately calculated, it does not matter which combination is selected at this point in time.

In Steps S305 through S307 to be described below, the total instruction lengths of the respective second combinations shown in FIGS. 7 through 9 are calculated.

Specifically, in Step S305, the total instruction length, where the remaining variables are allocated to other register resources in accordance with the first instruction format, is calculated. In Step S306, the total instruction length, where the remaining variables are allocated to other register resources in accordance with the second instruction format, is calculated.

Similarly, in Step S307, the total instruction length, where the remaining variables are allocated to memory resources, not the register resources, in accordance with the first instruction format, is calculated. In this case, an address usable for allocating a variable to an associated memory resource is assumed to be 16-bit absolute address, and a transfer instruction of the variable from a memory to a register is assumed to be composed of 3 bytes for the sake of simplicity. In addition, in Step S307, the total instruction length, where the remaining variables are allocated to memory resources, not the register resources, in accordance with the second instruction format, is also calculated. In this case, an address usable for allocating a variable to an associated memory resource is assumed to be 16-bit absolute address, and a transfer instruction of the variable from a memory to a register is assumed to be composed of 4 bytes for the sake of simplicity.

Next, in Step S308, the total length of the instructions for the entire basic block in accordance with this combination is calculated based on the results of Steps S305 through S307.

The same processing is performed on all the other possible combinations in Step S309. Finally, in Step S310, one of the combinations, resulting in the minimum length of the instructions for the basic block, is selected.

The compiler of the present invention minimizes the size of a machine-executable object program by performing these processing steps. This processing will be further detailed with reference to the accompanying drawings.

FIG. 6 illustrates the allocation of variables to respective resources in accordance with a conventional method and a machine instruction program, in which respective instructions are assigned following the variable-to-register allocation. Specifically, in the example shown in FIG. 6, variables are sequentially allocated to some register resources accessible in the first instruction format and then to the other register resources without prioritizing the allocation of these resources. In this case, the total length of instructions for the basic block is 46 bytes.

FIG. 7 illustrates an exemplary allocation of variables to respective resources based on the life ranges and frequencies of reference of respective variables shown in FIG. 5 according to the present invention and a machine instruction program, in which respective instructions are assigned following the variable-to-register allocation. Specifically, in the example shown in FIG. 7, variables p1 and p2 are preferentially allocated to only the registers accessible in the first instruction format (i.e., registers D2 and D3). In this case, the total length of instructions for the basic block is 42 bytes, which is smaller than that shown in FIG. 6 by 4 bytes.

FIG. 8 illustrates another exemplary allocation of variables to respective register resources according to the present invention and a machine instruction program associated with the allocation. As in FIG. 7, the allocation of variables to only the registers accessible in the first instruction format is prioritized in FIG. 8. In the example shown in FIG. 8, however, the formats applied to some of the instructions are changed from second into first. As a result, the total instruction length itself for the basic block is 44 bytes, which is 2 byte larger than that shown in FIG. 7. However, as can be seen by comparing respective lengths of machine instructions between FIGS. 7 and 8 on an individual intermediate language basis, the lengths of machine instructions for the intermediate languages s1 and s8 are shorter in FIG. 8 than in FIG. 7 by one byte. This is because these intermediate languages s1 and s8 both include an instruction described in the first instruction format. In this example, the variables p1 and p2, which are referred to relatively frequently, are allocated to the registers D2 and D3 within the first register file 220 in the intermediate language s1. The variable t1, which is used with these variables p1 and p2, is also allocated temporarily to the work register D0 within the first register file 220. Accordingly, the instructions mov D2,D0 and add D3,D0 are each described in the first instruction format with one byte.

FIG. 9 illustrates an ultimate allocation of variables to register resources and a machine instruction program in which the assignment of instructions has been optimized based on the results shown in FIGS. 7 and 8. In FIG. 9, each intermediate language is selected to have the shorter machine instruction length from the two types of intermediate languages shown in FIGS. 7 and 8. Specifically, the intermediate languages s2 through s7 shown in FIG. 7 are selected as the counterparts in FIG. 9, and the intermediate languages s1 and s8 shown in FIG. 8 are selected as the counterparts in FIG. 9. Although the intermediate languages s2 and s3 shown in FIG. 7 have the same machine instruction length as the counterparts shown in FIG. 8, those shown in FIG. 7 are selected. This is because processing can be performed faster in such a case since the number of instructions is smaller in FIG. 7 than in FIG. 8. As a result, the total code size is even smaller in FIG. 9 than in FIG. 7 by 2 bytes. In this manner, a machine instruction program with the smallest code size is produced for the intermediate language program shown in FIGS. 3 and 4.

In the machine instruction program shown in FIG. 9, the instructions mov D2,D0 and add D3,D0 of the intermediate language s1 and the instruction add 5,D0 of the intermediate language s8 are described in the first instruction format using the registers D0, D2 and D3 within the first register file 220, while the other intermediate languages s2 through s7 are described in the second instruction format using the second register file 120. And this machine instruction program is stored on a computer-readable storage medium.

In the foregoing embodiment, the respective variables p1, p2, and t1 through t8 for the basic block are allocated to appropriate ones of the registers D2, D3 and E0 through E7. If the number of variables to be allocated to respective resources exceeds the number of allocable register resources, then these variables are allocated to all of these registers and memory resources. In such a case, the total length of instructions, where variables are allocated to memory resources, is calculated in Step S307 shown in FIG. 3. In allocating some of the variables to memory resources in this manner, the first instruction format is applied to a set of instructions including a data transfer instruction by temporarily using any of the registers included in the first register file 220. As a result, although the number of instructions increases, the total length of instructions can be shortened and the ultimate code size may be reduced.

What is claimed is:

1. A compiler for translating a source program, including a plurality of instructions, into an object program, the compiler comprising:

first instruction length calculating means for calculating a total length of the instructions where variables for the source program are allocated to a first type of register resources in accordance with a first instruction format; and second instruction length calculating means for calculating a total length of the instructions where the variables are allocated to a second type of register resources in accordance with a second instruction format, the length of one instruction defined by the second instruction format being different from that defined by the first instruction format, wherein the variables are allocated to respectively appropriate ones of the register resources based on the results of calculation derived by the first and second instruction length calculating means.

2. The compiler of claim 1, further comprising third instruction length calculating means for calculating a total length of the instructions where the variables are allocated to memories, wherein the variables are allocated to respectively appropriate ones of the register resources based on the results of calculation derived by the first, second and third instruction length calculating means.

3. The compiler of claim 1, wherein the variables are allocated to respectively appropriate ones of the register resources to make an ultimate total length of the instructions as short as possible based on the results of calculation derived by the first and second instruction length calculating means.

4. The compiler of claim 1, wherein the first type of register resources are included in the second type of register resources.

5. The compiler of claim 4, wherein the length of one instruction defined by the first instruction format is shorter than that defined by the second instruction format.

6. The compiler of claim 1, wherein some of the variables for the source program, which are referred to relatively frequently, are preferentially allocated to the first type of register resources accessible in the first instruction format.

7. The compiler of claim 6, wherein in manipulating some of the variables for the source program, which have been allocated to the first type of register resources, the manipulation is described preferentially in the first instruction format.

8. The compiler of claim 6, wherein some of the variables for the source program, which are referred to relatively frequently, and other variables used along with the former variables are preferentially allocated to the first type of register resources.

9. A system for minimizing the code size of an object program executable on a computer, the object program having been translated from a source program using a compiler, the source program including a plurality of instructions, the compiler comprising:

first instruction length calculating means for calculating a total length of the instructions where variables for the source program are allocated to a first type of register resources in accordance with a first instruction format; and second instruction length calculating means for calculating a total length of the instructions where the variables are allocated to a second type of register resources in accordance with a second instruction format, the length of one instruction defined by the second instruction format being different from that defined by the first instruction format, wherein the variables are allocated to respectively appropriate ones of the register resources based on the results of calculation derived by the first and second instruction length calculating means.

10. A computer-readable storage medium having stored thereon an object program that has been translated using a compiler from a source program including a plurality of instructions, wherein the object program includes not only instructions described in a first instruction format using a first type of register resources, but also instructions described in a second instruction format using a second type of register resources, the length of one instruction defined by the second instruction format being different from that defined by the first instruction format, and wherein each said instruction is identified as being in the first or second instruction format by a value in a particular field in the instruction.

* * * * *